(12) United States Patent
Deplaris

(10) Patent No.: US 11,414,006 B2
(45) Date of Patent: Aug. 16, 2022

(54) LOCKING MECHANISM FOR TIE DOWN LOCKING DEVICE

(71) Applicant: Nicholas Deplaris, Oak Lawn, IL (US)

(72) Inventor: Nicholas Deplaris, Oak Lawn, IL (US)

( * ) Notice: Subject to any disclaimer, the term of this patent is extended or adjusted under 35 U.S.C. 154(b) by 0 days.

(21) Appl. No.: 16/996,542

(22) Filed: Aug. 18, 2020

(65) Prior Publication Data
US 2022/0055521 A1  Feb. 24, 2022

(51) Int. Cl.
*B60P 7/08* (2006.01)

(52) U.S. Cl.
CPC ..................... *B60P 7/083* (2013.01)

(58) Field of Classification Search
CPC ...................................................... B60P 7/083
See application file for complete search history.

(56) References Cited

U.S. PATENT DOCUMENTS

| | | | | |
|---|---|---|---|---|
| 2,496,172 A * | 1/1950 | Pearce | ................... | E21B 19/10 188/67 |
| 4,516,515 A * | 5/1985 | Johnson | ................... | B63B 13/00 114/197 |
| 4,771,987 A * | 9/1988 | Priest | ................... | B60P 3/1066 254/280 |
| 5,560,086 A * | 10/1996 | Huang | ................... | B60P 7/083 24/68 CD |
| 5,806,380 A * | 9/1998 | Wilsey | ................... | B25B 13/48 7/151 |
| 5,894,638 A * | 4/1999 | Huang | ................... | B60P 7/083 24/68 CD |
| 5,913,507 A * | 6/1999 | Lauricella, Jr. | ........... | B66D 1/04 254/325 |
| 5,944,146 A * | 8/1999 | Okpokowuruk | ...... | F16D 63/008 188/67 |
| 5,966,080 A * | 10/1999 | Bigsby | ................... | B63B 13/00 114/197 |
| 6,431,525 B1 * | 8/2002 | Roll | ................... | B66D 1/04 254/357 |
| 6,880,810 B1 * | 4/2005 | Hu | ................... | B60P 7/083 24/69 ST |
| 6,928,943 B1 * | 8/2005 | Neubauer | ................... | B63B 13/00 114/197 |
| 6,938,881 B2 * | 9/2005 | Grapes | ................... | B66D 1/06 254/213 |
| 7,017,887 B1 * | 3/2006 | Verakis | ................... | B66D 1/12 254/342 |
| 7,128,307 B2 * | 10/2006 | Dow | ................... | B66D 1/04 254/342 |
| 7,374,152 B2 * | 5/2008 | Ruan | ................... | B60P 7/083 254/217 |
| 7,510,168 B1 * | 3/2009 | Lin | ................... | B65B 13/025 24/68 CD |
| 7,648,124 B2 * | 1/2010 | Beers | ................... | B63B 13/00 254/323 |

(Continued)

*Primary Examiner* — Jason W San
(74) *Attorney, Agent, or Firm* — K&L Gates LLP

(57) ABSTRACT

A locking mechanism for use on a ratchet assembly includes a ratchet assembly including a ratchet body, a ratchet axle, ratchet gears, and a ratchet handle, wherein the ratchet handle moves between a locked position and a released position; an aperture for receiving a drain plug; and a pin that extends through a throughhole in the ratchet body, wherein, when the handle is in the released position, the pin extends through the throughhole.

10 Claims, 4 Drawing Sheets

(56) References Cited

U.S. PATENT DOCUMENTS

| | | | | |
|---|---|---|---|---|
| 8,209,821 B1* | 7/2012 | Chen | B60P 7/083 24/68 CD |
| 8,370,997 B2* | 2/2013 | Wright | A44B 11/125 24/68 CD |
| 8,915,485 B2* | 12/2014 | Joubert | B60P 7/083 254/217 |
| 9,227,551 B2* | 1/2016 | Yang | B60P 7/083 |
| 9,725,029 B2* | 8/2017 | Chou | B60P 7/083 |
| 10,065,554 B1* | 9/2018 | Xia | B60P 7/083 |
| 2005/0125959 A1* | 6/2005 | Hanson | B60P 7/083 24/68 CD |
| 2008/0148537 A1* | 6/2008 | Huang | B60P 7/083 24/68 CD |
| 2008/0189921 A1* | 8/2008 | Tomosue | B60P 7/0846 24/68 R |
| 2008/0307618 A1* | 12/2008 | Huang | B60P 7/083 24/68 CD |
| 2010/0071174 A1* | 3/2010 | Adcock | B60P 7/083 24/68 CD |
| 2010/0199473 A1* | 8/2010 | Long | B25B 13/02 24/68 CD |
| 2010/0295004 A1* | 11/2010 | Huang | B60P 7/0846 254/218 |
| 2010/0322737 A1* | 12/2010 | Huang | B60P 7/083 410/100 |
| 2011/0061213 A1* | 3/2011 | Chang | B60P 7/083 24/68 CD |
| 2011/0179609 A1* | 7/2011 | Huang | B60P 7/083 24/68 CD |
| 2011/0233493 A1* | 9/2011 | Huang | B60P 7/083 254/250 |
| 2011/0271500 A1* | 11/2011 | Huang | B60P 7/083 24/68 CD |
| 2012/0073097 A1* | 3/2012 | Chang | B60P 7/083 24/68 CD |
| 2012/0074363 A1* | 3/2012 | Chang | B60P 7/083 254/218 |
| 2012/0167707 A1* | 7/2012 | Chang | F16G 11/12 74/491 |
| 2012/0233823 A1* | 9/2012 | Chou | B60P 7/0846 24/68 CD |
| 2013/0031755 A1* | 2/2013 | Huang | B60P 7/083 24/68 CD |
| 2018/0187441 A1* | 7/2018 | Underwood | E04H 4/143 |
| 2018/0339637 A1* | 11/2018 | Hatcher | B60P 7/083 |
| 2019/0255983 A1* | 8/2019 | Zhou | B60P 7/083 |
| 2019/0255984 A1* | 8/2019 | Kingery | B60P 7/083 |
| 2020/0339029 A1* | 10/2020 | Chen | B60P 7/083 |
| 2020/0377003 A1* | 12/2020 | Egigian | B60P 7/0838 |
| 2021/0016702 A1* | 1/2021 | Huang | B60P 7/083 |
| 2021/0122287 A1* | 4/2021 | Mollick | F16G 3/006 |
| 2021/0170937 A1* | 6/2021 | Chen | B60P 7/0846 |

* cited by examiner

LOCKING MECHANISM FOR TIE DOWN LOCKING DEVICE

BACKGROUND OF THE INVENTION

The present subject matter relates generally to tie down locking devices that ensure that the drain plug is either inserted or removed from a boat as needed. More specifically, the present invention relates to tie down locking devices that include a locking mechanism requiring a drain plug to operate.

While the structure and design of the drain and drain plug on a boat is simple, these components serve an important purpose in the functioning of a boat. After the user has finished boating and removes the boat from the water, any water that has entered the hull is drained by lifting the bow of the boat and angling the boat downwards toward the stern with the drain plug removed. This angling positions the drain at the lowermost point. Prior to placing the boat into the water, the drain plug must be inserted into and secured within the drain to prevent water from flowing into the hull. When the boat is being used, water inevitably seeps into the hull through the seal around the drain plug, through valves and various pump cartridge holders, or the bilge pump within the hull. Therefore drainage of the hull is a necessary step in storing and maintaining the boat.

It is not uncommon for boaters to accidentally forget to remove the drain plug after boating and/or insert the drain plug back into the drain prior to boating. Even the most experienced boaters can easily skip these steps. When the drain plug is not removed after use, the boat is weighed down significantly by excess water in the hull. This creates difficulty for transportation and leads to cleanliness and other maintenance problems. When the boater forgets to insert the drain plug before placing the boat in the water, the hull immediately begins to fill with water when the boat is placed on the water without the boater realizing the problem until it is too late. Flooding of the hull leads to costly repairs.

One common method that boaters use to help remind them to remove/insert the drain plug is to attach the drain plug to the transom strap by a string or strap. The transom or tie down strap is durable, high-strength belt that is used to attach the boat to a trailer. Once the boat is mounted on the trailer, a first end of the transom strap is secured to the stern of the boat and a second end of the transom strap is secured directly to the trailer. The transom strap is then pulled taut in order to restrict movement of the boat on the trailer. The drain plug is located in the transom of the boat stern, so securing the drain plug to the transom strap serves as a reminder to position the drain plug as needed. The downside of this reminder is that boaters may see the drain plug and still easily overlook the step of positioning it in place. Although it makes the drain plug more convenient, it does not guarantee use of the drain plug.

Accordingly, there is a need for a device that allows the watercraft to be secured to the trailer only if the drain plug is appropriately removed/inserted, as described herein.

BRIEF SUMMARY OF THE INVENTION

To meet the needs described above and others, the present disclosure provides a tie down locking device including an aperture for receiving a drain plug, wherein the drain plug must be positioned within the aperture in order for the tie down locking device to move into a locked position.

By requiring installation of a drain plug in the tie down locking device in order for the transom or tie down strap to function, the boater must give attention to the positioning of the drain plug, minimizing the chances that the boater will neglect to remove the drain plug when loading the trailer and/or to insert the drain plug when preparing to boat.

In a first embodiment, the tie down locking device is a ratchet strap having a ratchet assembly that includes a locking mechanism. The ratchet assembly is secured to a surface on the loading platform such as a trailer, and an attachment mechanism on the end of the strap is secured to the boat or object being secured to the loading platform. The ratchet assembly allows the user to tighten the strap by actuating the ratchet handle. The ratchet handle moves between an uppermost locking position, where the strap freely rotates about the axle of the ratchet assembly, and a lowermost locked position, which locks the strap into position relative to the axle.

The locking mechanism on the ratchet assembly includes a first pin that locks the handle in the uppermost locked position when the drain plug is removed from the locking mechanism and a second pin that restricts movement of the handle so that it rotates about the axle but cannot reach the uppermost locked position when the drain plug is inserted into the locking mechanism.

The first pin moves through a throughhole in the handle to obstruct movement of the handle. The second pin moves into a groove in the handle to limit the rotation of the handle about the axle. A member extends across a pivoting structure between the first and second pins, and a spring around the second pin biases the member into position. Placing a drain plug into an aperture adjacent to the second pin compresses the second pin into the groove.

When the boat is loaded onto the trailer and the ratchet strap is tightened about the axle of the ratchet assembly, the ratchet handle is positioned in a locked lowermost position. The drain plug may be stored in the aperture during transport.

When the user arrives as his destination and wants to remove the boat from the trailer, the drain plug in the aperture restricts movement of the handle such that the handle cannot reach the locked uppermost position, which would allow the strap to fully loosen and move freely about the axle. Once the drain plug is removed, the handle can be moved into the locked uppermost position, where the first pin automatically locks the handle into place.

The handle can move out of the uppermost locked position only when the drain plug is positioned back into the locking device once it is time to load the boat onto the trailer again. After the user has finished boating, he removes the drain plug from the boat and loads the boat onto the trailer. After he tightens the strap, he stores the drain plug in the aperture during transportation.

In a second embodiment, the tie down locking device includes first and second plates that cooperate together to move between an open position and a closed position. The plates are secured together using bolts that allows for movement of the first plate relative to the second along the planar surfaces. A spring is positioned between first and second spring protrusions on each of the first and second plates to urge the plates apart.

The front plate includes a slotted cavity toward an upper end thereof that angles toward an upper right corner. The slotted cavity includes an opening along a perimeter of the front plate. The rear plate includes a centrally-located rounded cavity defined by a bulbous corner toward an upper end thereof. The rear plate includes an opening along the perimeter below the bulbous corner connected to the rounded opening. In the open position, the front plate is positioned against the rear plate such that the opening of the front plate is aligned with the opening of the second plate. In this position, the aligned openings of the front and rear plate, respectively, can receive a structure such as a hook on a transom of a boat.

Each of the front and rear plate includes an aperture for receiving a drain plug. When the front and rear plates are in the closed position, the apertures are aligned and the drain plug must be inserted through the apertures in order for the plates to maintain a locked position. When the drain plug is removed, the spring biases the front plate downwardly into the open position, allowing the structure to be released from the aligned openings. The apertures are no longer aligned.

During use, the user loads the boat on the trailer and locks the transom strap onto the transom of the boat using the locking device. The user must remove the drain plug from the boat and insert it into the locking device in order for the locking device to work. Once the user is ready to take the boat off of the trailer, the user must remove the drain plug from the locking device in order to open the locking device and remove the transom strap from the boat. The user is reminded to insert the drain plug in the boat as he unloads the boat from the trailer.

An object of the invention is to provide a locking mechanism requires the use of a drain plug in order to operate the locking device so that the user is forced to remove or insert the drain plug on the boat.

Additional objects, advantages, and novel features of the solutions provided herein will be recognized by those skilled in the art based on the following detail description and claims, as well as the accompanying drawings, and/or may be learned by production or operation of the examples provided herein.

BRIEF DESCRIPTION OF THE DRAWINGS

The figures depict one or more embodiments of the subject matter described herein. They are provided as examples only. Within the figures, reference numbers are used to refer to elements described in the detailed description.

DETAILED DESCRIPTION OF THE INVENTION

Figure 1:
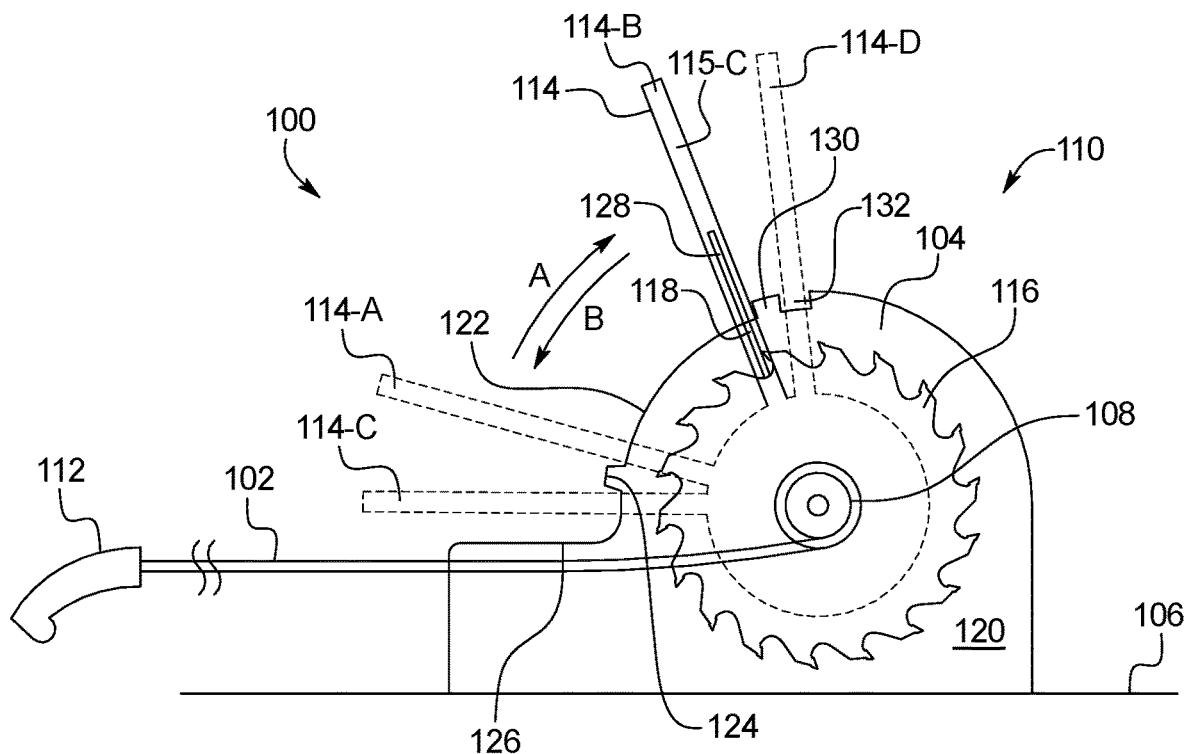
FIG. 1 is a schematic diagram illustrating the internal components of a first embodiment of a tie down locking device including the locking mechanism of the present application.

The present application is directed to tie down locking devices that require the installation of a drain plug in order to operate the locking device and securely attach a boat to a loading platform. The tie down locking devices described herein require a drain plug to be positioned in place in order to operate. While the designs require the use of a drain plug, the locking mechanisms may be used in a wide variety of settings, such as securing a ladder to a roof of a truck, securing an ATV to a trailer, or other similar loading scenarios. In such other embodiments, the locking device may require a separate tool in lieu of the drain plug.

FIGS. 1-4 illustrate a first embodiment of a tie down locking device 100. In this embodiment, the tie down lockout device 100 includes a ratchet strap 102 having a ratchet body 104 that attaches to the platform 106 onto which the boat is loaded. The ratchet strap 102 is wound about a ratchet axle 108 within a rachet assembly 110, and an attachment mechanism 112 on the end of the ratchet strap 102 is secured to the transom on the boat. A locking mechanism 134 (FIG. 2) is incorporated into the ratchet assembly 110 as described in greater detail blow.

Referring to FIG. 1, the ratchet assembly 110 includes a ratchet handle 114 that is attached to the ratchet axle 108. The ratchet axle 108 is transversely mounted and rotatably supported within the ratchet body 104, and a pair of ratchet gears 116 are mounted to the ratchet axle 108. The ratchet axle 108 can be rotated by actuating the ratchet handle 114 in directions A and B. At the base of each side of the ratchet handle 114, first and second planar surfaces 115A, 115B are adjacent to the axle 108 (FIGS. 2-4) outside of the ratchet gears 116 (FIGS. 3 and 4) and a handle portion 115C extending outwardly from the planar surfaces 115A, 115B.

A first end of the ratchet strap 102 is attached to the ratchet axle 108, and the attachment mechanism 112 is attached to a second end of the strap 102. Once the attachment mechanism 112 is secured on the boat, the strap 102 is drawn taut by using the ratchet handle 114 to rotate the ratchet axle 108. When the ratchet handle is moved in direction A between an unlocked lowermost position 114-A and an unlocked uppermost position 114-B, the ratchet handle 114 engages the ratchet gears 116 which thereby rotate the ratchet axle 108. More specifically, when the ratchet handle 114 has moved to the unlocked lowermost position 114-A, a ratchet locking mechanism 118 in the ratchet handle 114 is biased toward the axle 108 and engages from the ratchet gears 116 as it moves in direction A, thereby rotating the axle 108 and winding a portion of the strap 102 onto the axle 108. When the ratchet handle 114 has moved to the unlocked uppermost position 114-B, the ratchet locking mechanism 118 releases the ratchet gears 116 so that the ratchet handle 114 can move freely in direction A to the lowermost position 114-A. These motions are repeated until the strap 102 is fully tightened.

Once fully tightened, the ratchet handle 114 is positioned in a locked lowermost position 114-C. The ratchet body 104 includes parallel body frame members 120 positioned outside of the ratchet gears 116. The body frame member 120 have an arcuate shape with an edge 122 that tracks along the ratchet gears 116. At the lowermost point on the body frame member 120, a protrusion 124 extends radially from the body frame member 120 to form a lowermost locking groove 126. The ratchet locking mechanism 118 is biased toward the axle 108 and gears 116, and a release lever 128 must be compressed in order to move the ratchet locking mechanism 118 away from the axle 108 and gears 116, allowing the handle 114 to move into the lowermost locking groove 126. Once the handle is positioned in the locked lowermost position 114-C with the ratchet locking mechanism 118 in the lowermost locking groove 126, the release lever 126 is released and the handle 114 is in a fully locked position, locking the strap 102 in relative to the body 104.

In order to release tension in the ratchet strap 102 in order to remove the boat from the trailer, the release lever 122 is compressed, moving the ratchet locking mechanism 118 upwardly so that the ratchet handle 114 can move out of the lowermost locking groove 126. The ratchet handle 114 is then moved into the uppermost locked position 114-D, unlocking the ratchet gears 116 and permitting the ratchet axle 108 to spin freely and unwind the ratchet strap 102 from the axle 108. At an uppermost point on the body frame member 120, a protrusion 130 extends radially from the body frame member 120 to define an uppermost locking groove 132. The release lever 128 is compressed to pull the ratchet locking mechanism 118 away from the gears 116 so that it can shift over the protrusion 130 and into the uppermost locking groove 132. Once the handle 114 is positioned in the locked uppermost position 114-D with the ratchet locking mechanism 118 in the uppermost locking groove 132, the release lever 128 is released and the handle 114 is locked in a fully released position, allowing the strap 102 to move freely away from the body 104.

Figure 2:
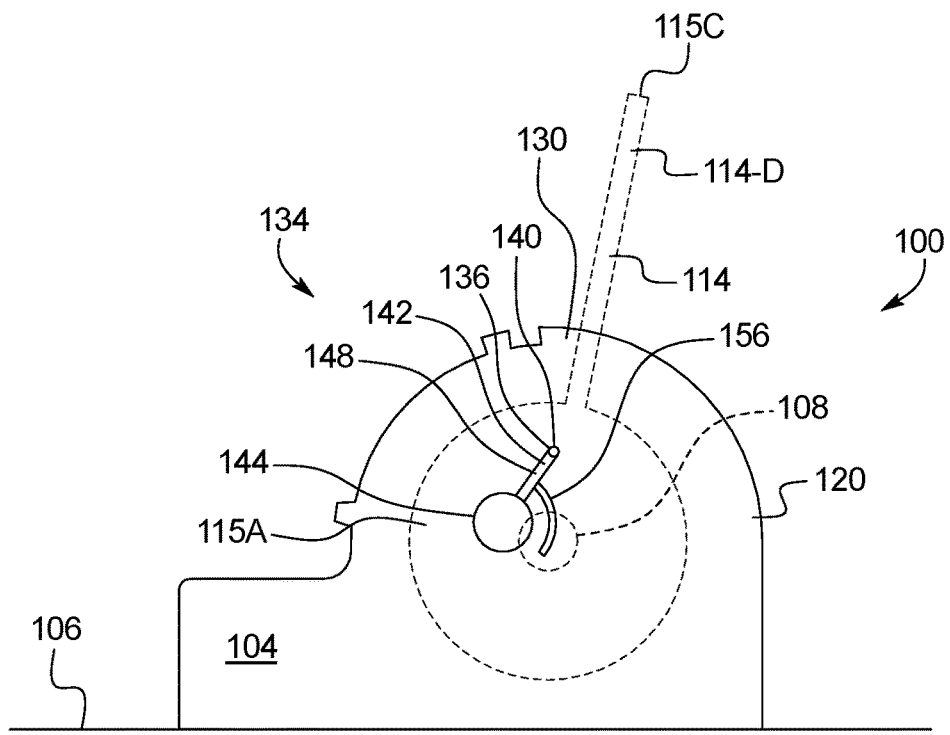
FIG. 2 is schematic diagram illustrating the locking mechanism of FIG. 1.
Figure 4:
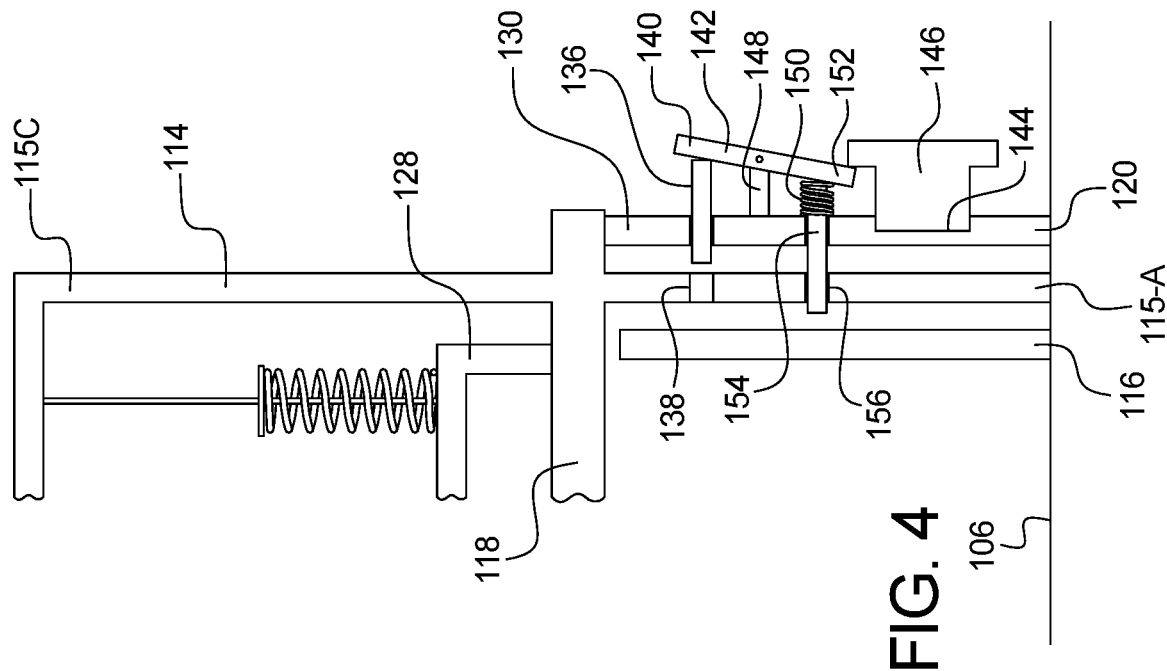
FIGS. 3 and 4 are schematic diagrams illustrating the locking mechanism moving between a locked position and an open position, respectively.
Figure 3:
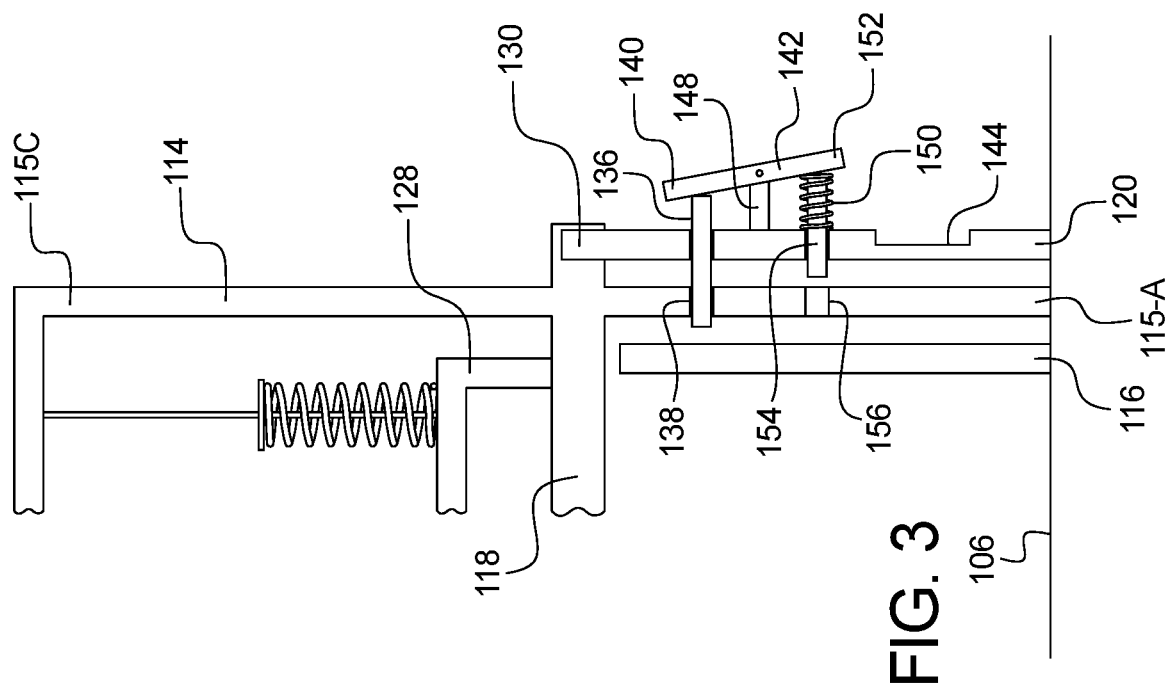

FIGS. 2-4 illustrate the operation of the locking mechanism 134 of the tie down locking device. The locking mechanism 134 includes a first pin 136 that moves in and out of a through-hole 138 on the planar surface 115A of the handle 114 in order to restrict movement of the handle 114. The pin 136 also moves through an opening on the body frame member 120 of the ratchet body 104. In other embodiments, the ratchet body 104 may include additional structures or components in and around the locking mechanism 134.

The throughhole 138 on the planar surface 115A of the handle 114 and the pin 136 are positioned such that, when the first pin 136 is inserted into the through-hole 138 as shown in FIG. 3, the handle 114 is in the locked uppermost position 114-D. The handle 114 cannot move out of the locked uppermost position 114-D even if the release lever 128 is compressed upwardly to move the ratchet locking mechanism 118 upward and over the protrusion 130. With the handle 114 in the locked uppermost position 114-D, the strap moves freely within the ratchet assembly.

The first pin 136 is secured to a first end 140 of a member 142 that extends between an aperture 144 in the body 104 for receiving the drain plug 146 and the pin 136. The member 142 extends across a pivot structure 148, and a spring 150 or other biasing structure is positioned between the body 104 (or frame member 120) and a second end 152 of the member 142 adjacent to the aperture 144 as shown in FIGS. 3 and 4. The spring 150 biases the first pin 136 into the throughhole 138 when the throughhole is aligned with the first pin 136 and the drain plug 146 is not inserted into the aperture 144. When a drain plug 146 is inserted into the aperture 144, it compresses the second end 152 of the member 142 against the biasing force of the spring 150, causing the first pin 136 to withdraw outwardly through the throughhole 138 until the first pin 136 no longer obstructs movement of the handle 114 as shown in FIG. 4.

The user puts the handle 114 in the uppermost position 114-D when loading the boat on the trailer. With the drain plug 146 removed, the handle 114 is in the locked uppermost position 114-D and the strap 102 moves freely about the axle 108. In order to allow the handle 114 to engage the ratchet gears 116 and allow the device 100 to ratchet the strap 102 about the axle 108, the user inserts the drain plug 146 into the aperture 144 as shown in FIG. 4.

A second pin 154 is positioned within the spring 150 near the aperture 144. A corresponding groove 156 is formed within the planar surface 115A of the handle 114 and the ratchet body 104 for receiving the second pin 154 and therefore limiting movement of the handle 114. When the drain plug 146 is inserted into the aperture 144 as shown in FIG. 4, the spring 150 is compressed and the second pin 154 is inserted into the groove 156. A corresponding opening or groove is also formed in the body 104 or frame member 120, through which the second pin 154 extends to reach the groove 156 in the handle 114.

The length of the groove 156 is sized to allow the handle 114 to move between positions 114-B and 114-C as shown in FIG. 1. This movement allows for the handle 114 to engage the gears 116 and ratchet the strap 102 about the axle 108. When the boat is on the trailer, the drain plug 146 must be inserted into the locking mechanism 134 in order for the handle 114 to ratchet the strap 102 tight. Once the strap 102 is fully tightened, the handle 114 moves into the locked lowermost position 114-C, which secures the strap 102 in position. The drain plug 146 can remain in the locking device 100 as long as the boat is stored on the trailer or other platform. In some situations during transport, the presence of the drain plug 146 in the locking mechanism 134 provides an additional safety lock to keep the handle 114 in the locked position 114-C as the tie down locking device 100 is rattled during transport.

When the user decides to use the boat, the user drives the trailer to the boat site. The strap 102 is loosened by rotating the handle 114 into the locked uppermost position 114-D. Tension in the strap 102 can be released by moving the handle 114 out of the lowermost locked position 114-C, but the second pin 154 limits movement of the handle that is only allowed by the groove 156 in the planar surface 115A of the handle 114. The handle 114 can only rotate about the axle 108 as long as the second pin 154 is within the groove 156 when the drain plug 146 is inserted into the aperture 144 and compressing on the spring 150 and the second pin 154.

The user then removes the drain plug 146 from the locking mechanism 134, which releases the spring 150 and removes the second pin 154 from the groove 156. Removal of the drain plug 146 automatically causes the first pin 136 to be urged toward the planar surface 115A of the handle 114. When the handle 114 is moved into the position 114-D, the throughhole 138 within the planar surface 115A is aligned with the first pin 136, catching the pin 136 and locking the handle 114 into the locked uppermost position 114-D, which allows the strap 102 to be freely released from the axle 108. The user can then insert the drain plug 146 into the boat and remove the boat from the trailer.

Figure 5:
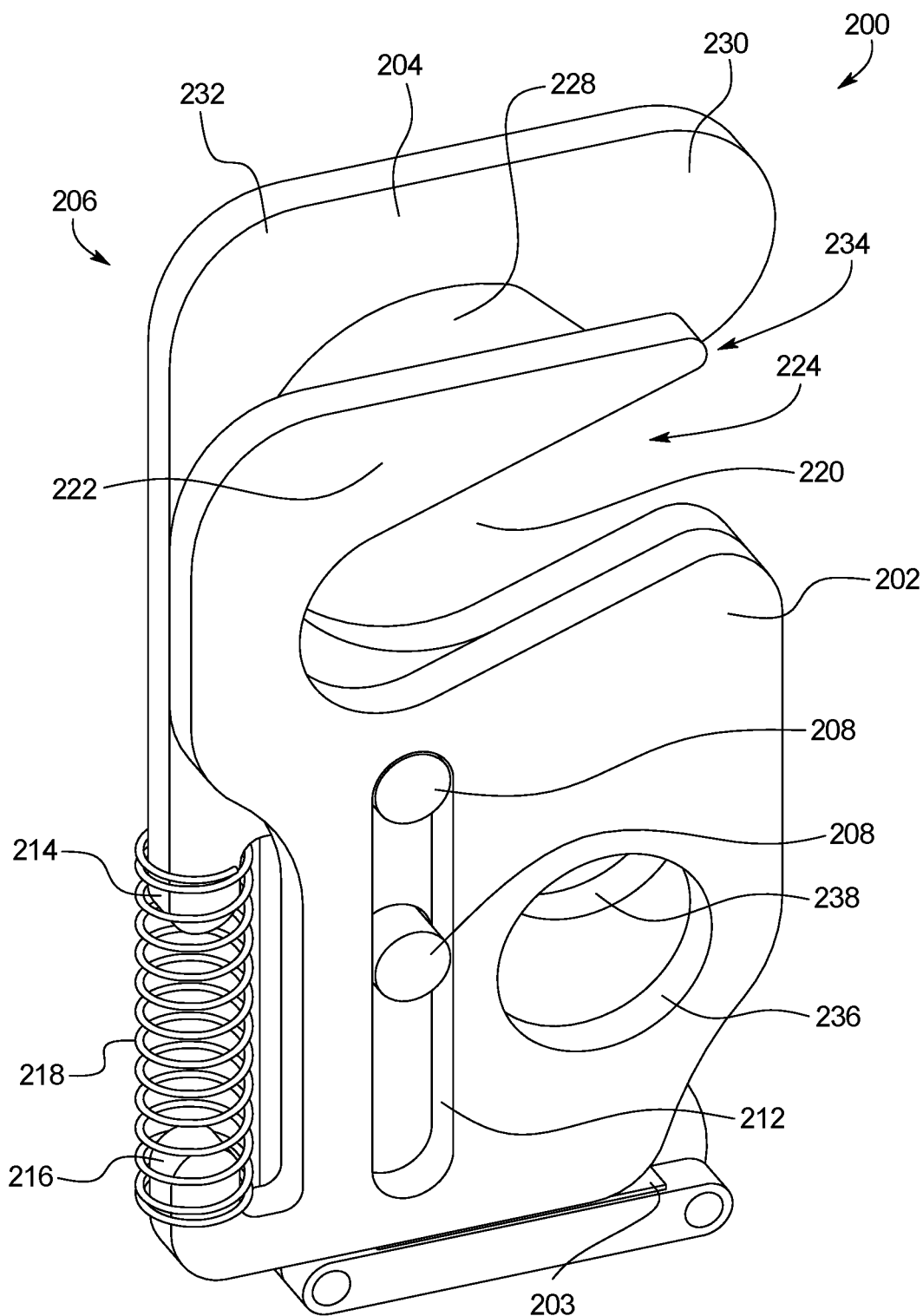
FIGS. 5 and 6 illustrate a second embodiment of a tie down locking device including the locking mechanism of the present application.
Figure 6:
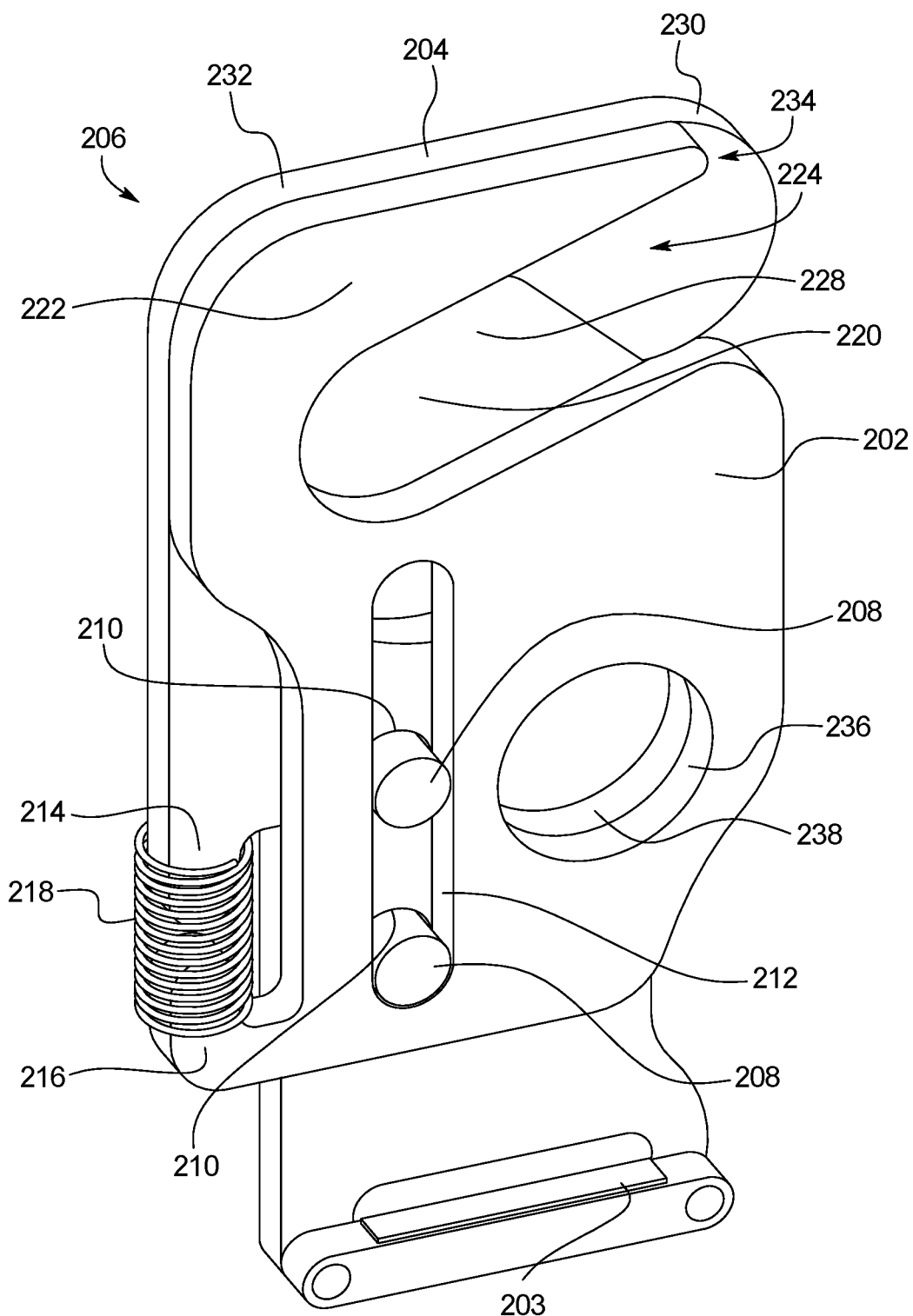

FIGS. 5 and 6 illustrate a second embodiment of a tie down locking device 200. In this embodiment, the tie down lockout device 200 includes front and rear plates 202, 204 that cooperate together to move between an open position shown in FIG. 5 and a closed position shown in FIG. 6. The locking device 200 is attached to a strap 203, which is also secured to a trailer or other platform. During use the locking device 200 connects to the transom of a boat and the strap is pulled taut. The strap 203 may be secured to the tie down locking device 200 through a buckle or any type of securement means.

The plates 202, 204 are secured together using a pair of bolts, rivets, or other attachment mechanisms 208 positioned within a pair of openings 210 in the rear plate 204 and a longitudinal groove 212 in the front plate 202. The bolts 208 remain stationary on the rear plate 204 while the front plate 202 moves within the constraints of the groove 212. The front and rear plates 202, 204 also include spring protrusions 214, 216 parallel to the groove 212. A spring 218 is positioned between the spring protrusions 214, 216 to urge the front plate 202 downwardly relative to the rear plate 204.

The front plate 202 includes a slotted cavity 220 toward an upper end 222 thereof that angles toward an upper right corner. The slotted cavity 220 includes an opening 224 along a perimeter 226 of the front plate 202. The rear plate 204 includes a centrally-located rounded cavity 228 defined by a bulbous corner 230 toward an upper end 232 thereof. The rear plate 204 includes an opening 234 below the bulbous corner 230 defining the rounded opening 228. In the open position of FIG. 5, the front plate 202 is positioned against the rear plate 204 such that a portion of the opening 224 of the front plate 202 is aligned with the opening 234 of the second plate 204. In this position, the aligned openings 224, 234 of the front and rear plate 202, 204, respectively, can receive a structure such as a hook on a transom of a boat.

Each of the front and rear plate 202, 204 includes an aperture 236, 238 for receiving a drain plug. When the front and rear plates 202, 204 are in the closed position shown in FIG. 6, the apertures 236, 238 are aligned and the drain plug must be inserted through the apertures 236, 238 in order for the plates 202, 204 to maintain a locked position. When the drain plug is removed, the spring 218 biases the front plate 202 downwardly into the open position shown in FIG. 5, allowing the structure to be released from the aligned openings 220, 228. The apertures 236, 238 may be either threaded or smooth for receiving drain plugs via threading or compression fit, respectively.

During use, the user loads the boat on the trailer and locks the transom strap onto the transom of the boat using the locking device 200. The user must remove the drain plug from the boat and insert it into the locking device 200 in order for the locking device 200 to work. Once the user is ready to take the boat off of the trailer, the user must remove the drain plug from the locking device 200 in order to open the locking device and remove the transom strap from the boat. The user is reminded to insert the drain plug in the boat as he unloads the boat from the trailer.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A tie down locking mechanism comprising:
a ratchet body including an aperture within the ratchet body adjacent to the ratchet and an opening having a central axis;
an axle transversely mounted within the ratchet body, wherein a central axis of the axle is offset from the central axis of the opening of the ratchet body;
a ratchet handle connected to the axle, the ratchet handle including a throughhole having a central axis parallel to the central axes of the opening and the axle, wherein the throughhole is positioned to move in and out of alignment with the opening of the ratchet body;
a first pin configured to move through the throughhole within the ratchet handle and the opening of the ratchet body;
a pivoting member including a distal end and a proximal end having a pivot point positioned between the distal end and the proximal end, extending from the aperture to the throughhole, wherein the first pin engages the distal end of the member relative to the aperture, wherein a spring is positioned between the proximal end of the pivoting member and the ratchet body, and wherein the pivoting member pivots about the pivot point;
the spring, adjacent to the aperture, configured to bias the proximal end of the pivoting member away from the ratchet body;
wherein, when the opening of the ratchet body and the throughhole of the ratchet handle are in alignment, the spring biases the pivoting member about the pivot point such that the first pin is moved through the aligned opening of the ratchet body and the throughhole of the ratchet handle to prevent movement of the ratchet handle; and wherein the aperture is configured to receive a drain plug.

2. The tie down locking mechanism of claim 1, further comprising a second pin that is configured to move through a groove within the ratchet handle, wherein the second pin is on the proximal end of the member.

3. The tie down locking mechanism of claim 2, wherein the groove is aligned with the second pin when the first pin is aligned with the throughhole.

4. The tie down locking mechanism of claim 1, wherein, when the drain plug is not positioned within the aperture, the spring biases the first pin toward the ratchet body.

5. The tie down locking mechanism of claim 1, wherein, when the drain plug is positioned within the aperture, the spring is compressed and the first pin is withdrawn from the throughhole within the ratchet body.

6. A method of locking a ratchet assembly the ratchet assembly including a ratchet handle extending from a ratchet axle within a ratchet body having a body frame member, wherein the ratchet handle attaches to the ratchet axle through ratchet gears to allow for winding a ratchet strap about the ratchet axle within a ratchet body, and wherein the ratchet handle engages with first and second protrusions on the body frame member and includes a release lever, the method comprising:
providing a tie down locking mechanism in the ratchet body, the tie down locking mechanism comprising:
the ratchet body including an opening having a central axis;
the axle transversely mounted within the ratchet body, wherein a central axis of the axle is offset from the central axis of the opening of the ratchet body;
the ratchet handle connected to the axle, the ratchet handle including a throughhole having a central axis parallel to the central axes of the opening and the axle, wherein the throughhole is positioned to move in and out of alignment with the opening of the ratchet body;
an aperture within the body frame member adjacent to the ratchet handle;
a first pin configured to move through the throughhole within the ratchet handle and the opening of the ratchet body;
a pivoting member including a distal end and a proximal end having a pivot point positioned between the distal and proximal ends, from the aperture to the throughhole, wherein a spring is positioned between the proximal end of the pivoting member and the ratchet body, wherein the first pin engages with the distal end of the member relative to the aperture, and wherein the pivoting member pivots about the pivot point; and
the spring, adjacent to the aperture, configured to bias the proximal end of the member away from the ratchet body;
attaching the ratchet body to a first surface;
attaching an end of the ratchet strap to a second surface;
inserting an object into the aperture of the tie down locking mechanism, thereby compressing the spring and withdrawing the first pin from the throughhole within the ratchet body;
tightening the ratchet strap as needed by rotating the ratchet handle about the ratchet axle between the first and second protrusions; and rotating the ratchet handle into a lowermost groove formed by the second protrusion and the body frame member distal to the first protrusion in order to lock the ratchet gears and maintain tension on the ratchet strap; and wherein the object comprises a drain plug of a watercraft.

7. The method of claim 6, further comprising the step of rotating the ratchet handle into an uppermost groove formed by the first protrusion and the body frame member distal to the second protrusion in order to unlock the ratchet gears and allow the strap to move freely about the ratchet axle.

8. The method of claim 6, wherein the first surface comprises one of a boat transom, a hook on a boat transom, a rack on a vehicle, a rail on a vehicle, and a rail on a trailer.

9. The tie down locking mechanism of claim 1, wherein the ratchet body includes the aperture having a central axis parallel to and offset from the central axes of the opening and the axle.

10. The method of claim 6, wherein the ratchet body includes the aperture having a central axis parallel to and offset from the central axes of the opening and the axle.

* * * * *